No. 779,374. PATENTED JAN. 3, 1905.
R. M. G. PHILLIPS.
FLEXIBLE SHAFT.
APPLICATION FILED MAR. 8, 1904.
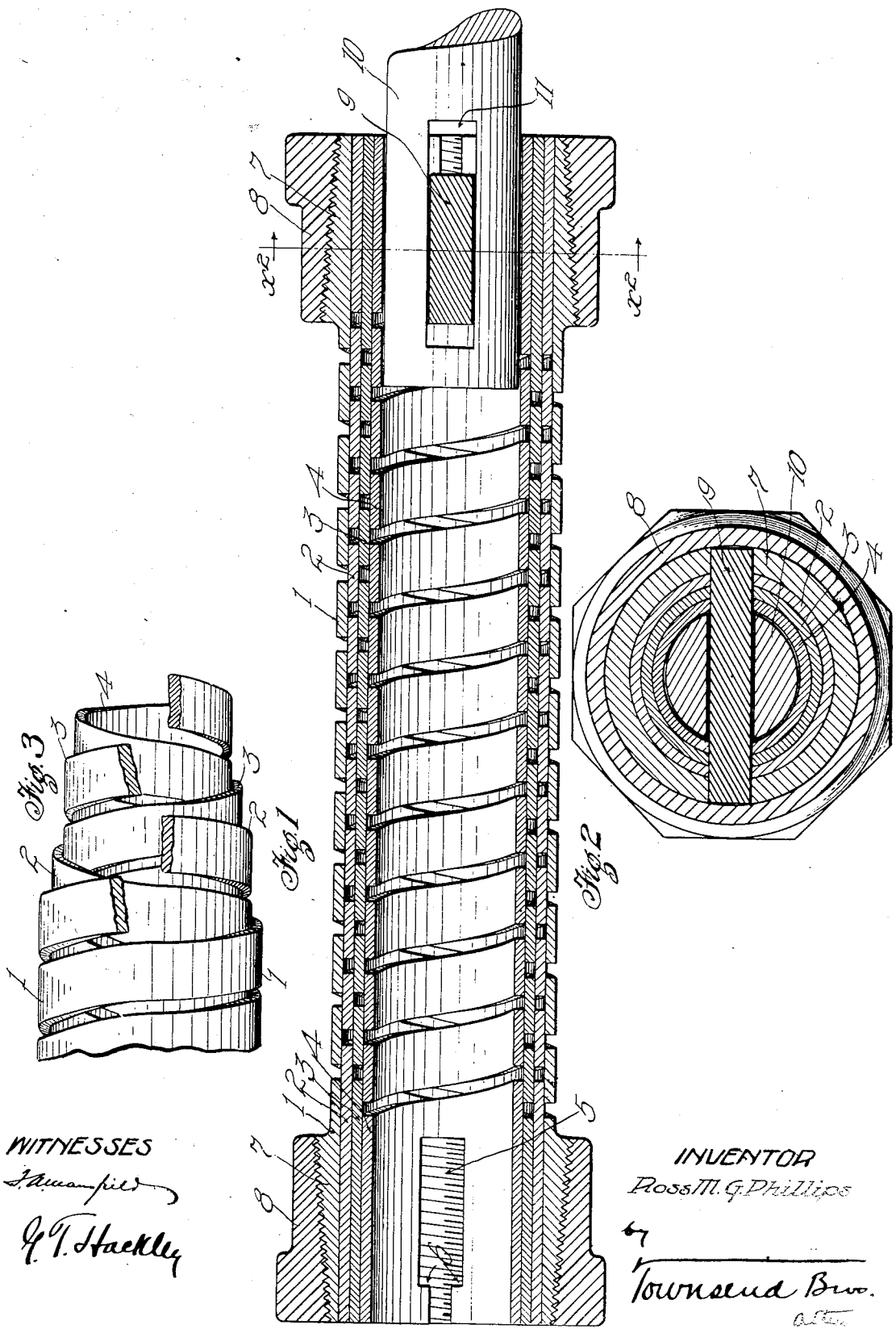
WITNESSES
INVENTOR
Ross M. G. Phillips
by
Townsend Bro.

No. 779,374.

Patented January 3, 1905.

UNITED STATES PATENT OFFICE.

ROSS M. G. PHILLIPS, OF LOS ANGELES, CALIFORNIA.

FLEXIBLE SHAFT.

SPECIFICATION forming part of Letters Patent No. 779,374, dated January 3, 1905.

Original application filed August 22, 1903, Serial No. 170,396. Divided and this application filed March 8, 1904. Serial No. 197,088.

*To all whom it may concern:*

Be it known that I, Ross M. G. PHILLIPS, a citizen of the United States, residing at Los Angeles, in the county of Los Angeles and State of California, have invented a new and useful Flexible Shaft, of which the following is a specification.

This is a divisional case from a former application of mine filed August 22, 1903, Serial No. 170,396.

This invention relates to a flexible shaft which is particularly adapted as a device for transmitting power between elements which rotate with axes not in line; and one object of the invention is to provide a joint which is springy axially, but which will sturdily resist torsional strains either way.

Another object is to provide means whereby the joint may be so connected to shafts that when the joint is flexed it will at all times act upon the shafts torsionally and not impart any tensile strains or tendencies to the shafts.

Other objects and advantages of the present invention will be brought out in the following description.

The accompanying drawings illustrate the invention, and referring thereto—

Figure 1 is a longitudinal sectional view through the joint, showing in one end a portion of a shaft attached to the joint. Fig. 2 is a section on line $X^2 X^2$, Fig. 1. Fig. 3 is a detail view showing the arrangement of the concentric spirals.

The invention comprises a plurality of concentric spiral springs.

A further feature which, while not vital to the generic invention, but which is of considerable value, is the means used for connecting the joint to a shaft in such a manner as to allow end thrust between the joint and shaft, so as to permit the change of relative alinement between the shaft and joint. This gives the device high efficiency, as it eliminates friction, lateral strains on the bearings of the shaft, and absorption of power.

1, 2, 3, and 4 designate, respectively, concentric tubes which are telescoped or nested one inside of the other, as shown. Each tube is cut spirally for a considerable portion of its length, thus forming, as it were, the intermediate portion of each tube into a spiral spring. The cuts are relatively narrow, so as to form a solid spiral band of metal of relatively considerable width. The spiral cuts do not extend clear to the ends of the tubes, as stated, but terminate short, as shown, so that the ends of the joint comprise solid tubular portions. These solid ends are provided with slots 5, which are constricted at their mouths by shoulders 6. The outer tube 1 at each end has a tapered thread 7, upon which is screwed an annular nut 8, correspondingly threaded.

A key 9 is supported at each end of the joint in the slots 5, extending diametrically through the joint, and the keys are clamped tightly in position by screwing up the nuts 8, which squeeze the split ends of the joint together. While the keys 9 are mechanically held in place by the conformation of the slots 5, the clamping effect produced by the nuts 8 prevents any possible displacement of the keys and prevents them from becoming loose and rattling.

10 designates the adjacent end of one shaft, which is provided with an elongated slot 11, the shaft 10 being slidably fitted within the inside tube 4, and the length of the slot 11 is sufficiently greater than the width of the key 9 so that the shaft and joint may have a relative longitudinal movement.

It should be understood that another shaft (not shown) is similarly mounted in the other end of the joint, being removed in Fig. 1 in order to clearly show the configuration of the slot 5.

Alternate tubes are cut with their spirals running in the same direction, adjacent tubes thus having oppositely-cut spirals. The inner tube 4 has a left-hand spiral, the tube 3 next to it has a right-hand spiral, the tube 2 has a left-hand spiral, and the tube 1 has a right-hand spiral. By this manner of arranging the spirals the joint is equally effective in transmitting a rotative force in either direction. It is obvious that a slight sliding movement will occur between the concentric tubes when the device is in operation, as when the joint is flexed the length of the outer arc along the length of the joint will be greater than the length of the inner arc, and as the joint rotates the springs will close up somewhat on the inner arc and spread out somewhat on the outer arc. The curved axial line of the joint will always have a constant length, inasmuch as the joint is practically non-stretchable and non-compressible, and owing to the sliding fit between it and the shafts to which it is coupled the joint will not have to sustain any stress tending to stretch it or compress it along its length. The same holds good in the action on the shafts.

When the joint is under tension transmitting power in a given direction of rotation, two of the spirals will contract and two will expand. Thus when driving in either direction two of the spiral ribbons will be under a tensile strain and two will be under a compression strain. The invention is adapted for use on motor-vehicles, as shown in the before-named application, and when so used the spirals may preferably be arranged so that when rotating to drive the vehicle ahead the outer spiral 1 will contract, the spiral 2 expand, the spiral 3 contract, and the spiral 4 expand, the contraction of the spirals 1 and 3 counteracting against the expansion of the spirals 2 and 4. Thus the greatest efficiency is obtained, as the expanding spirals being limited in their expansion by the contracting spirals transmit power under a compression strain helically, while the contracting spirals being limited in their contraction by the expanding spirals transmit power under a tensile strain helically sustained.

When the joint revolves in the reverse direction, it is manifest that the spirals 1 and 3 will expand and spirals 2 and 4 will contract, and thus only spirals 2 and 3 will counteract against each other; but this direction of rotation is maintained so infrequently and for such short periods and at such low speeds that the non-counteraction of the outer and inner spirals is of no moment.

What I claim is—

1. A flexible joint comprising a plurality of independent tubular members, each member having spiral cuts in its intermediate portion and having uncut ends, the cuts of the adjacent members running in opposite directions, and removable means for securing said members one within the other.

2. A flexible joint comprising a plurality of concentric tubular members nested together, each member having a spiral cut, and removable means upon the interior of said members for locking them against rotation relatively to each other.

3. A flexible joint comprising a plurality of concentric tubular members nested together, each member having an uncut portion at each end and a longitudinally-extensible, spirally-cut intermediate portion, and removable means for preventing the relative rotation of the respective members.

4. A plurality of longitudinally-extensible spirally-cut tubular members closely fitting one within the other, and keys in the ends of the tubes, in combination with shafts which slidably engage the keys.

5. A plurality of longitudinally-extensible spirally-cut tubular members closely fitting one within the other, and keys in the ends of the tubes, in combination with shafts having slots which receive the keys.

6. A flexible joint comprising a plurality of longitudinally-extensible spirally-cut tubular members closely fitting one within the other, the tubes having slots in their ends, keys in the slots and extending diametrically through the tubes, and means for clamping the keys.

7. A flexible joint comprising a plurality of spirally-cut tubular members closely fitting one within the other, the tubes having slots in their ends, keys in the slots and extending diametrically through the tubes, and annular nuts having tapered internal threads for squeezing the slotted ends of the tubes toward each other and clamping the keys.

8. A flexible joint comprising a plurality of spirally-cut tubular members closely fitting one within the other, the tubes having slots in their ends, keys in the slots and extending diametrically through the tubes, and annular nuts having tapered internal threads for squeezing the slotted ends of the tubes toward each other and clamping the keys, in combination with shafts the ends of which have elongated slots which slidably fit the keys.

In testimony whereof I have signed my name to this specification, in the presence of two subscribing witnesses, at Los Angeles, in the county of Los Angeles and State of California, this 1st day of March, 1904.

ROSS M. G. PHILLIPS.

Witnesses:
GEORGE T. HACKLEY,
A. M. HOLLY.